Dec. 1, 1936.  J. W. MIJNSSEN  2,062,722
DETACHABLE RIM
Filed April 22, 1935
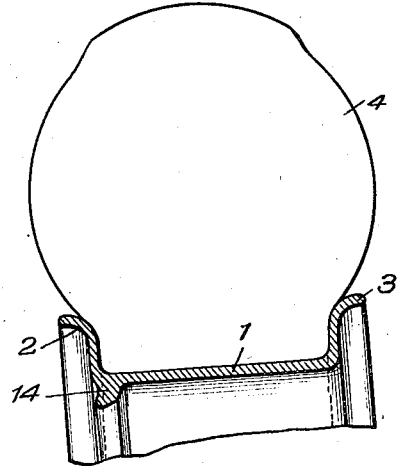
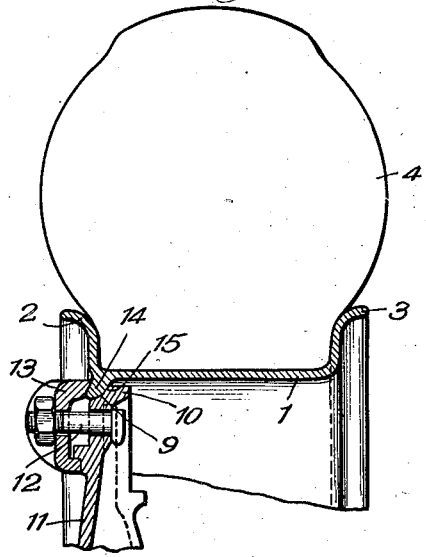
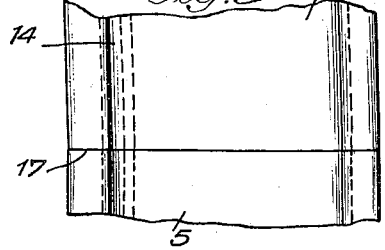
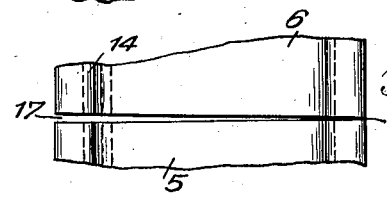
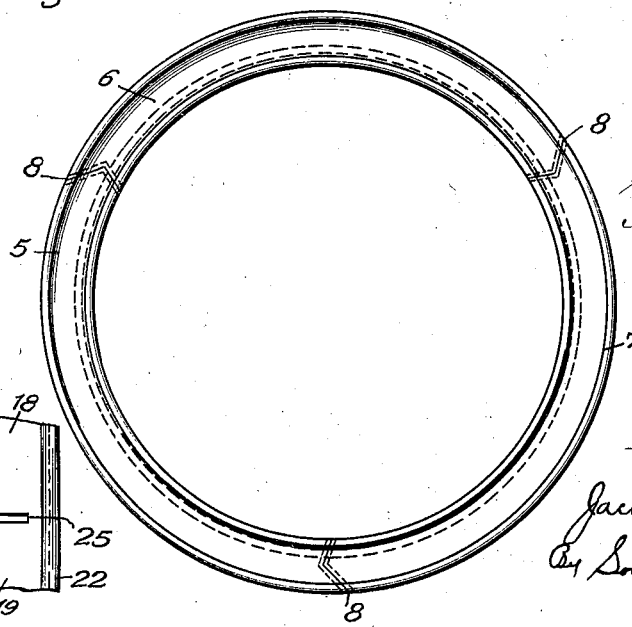
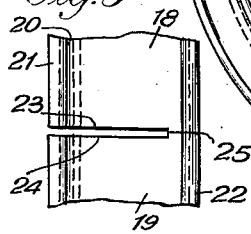
Inventor
Jacob W. Mijnssen
By Sommers & Young
Attys.

Patented Dec. 1, 1936

2,062,722

UNITED STATES PATENT OFFICE 2,062,722

DETACHABLE RIM

Jacob Willem Mijnssen, Schaffhouse, Switzerland, assignor to Aktiengesellschaft der Eisen- und Stahlwerke vormals Georg Fischer, Schaffhouse, Switzerland Application April 22, 1935, Serial No. 17,734
In Switzerland May 24, 1934

2 Claims. (Cl. 301—18)

This invention relates to vehicle wheels comprising a detachable rim having an undivided cross-section and being composed of several segmental portions. The point of seating the rim portions on the wheel body is disposed laterally of the middle plane of the body adjacent to one of the side flanges of the rim, any tilting moments acting on the rim segments due to the loading of the wheel being transmitted to the means for connecting the rim segments to the wheel body. The joining faces of the rim segments at the longitudinal ends thereof are so shaped that these segments contact with one another only at a point situated laterally of said middle plane adjacent to the side flange disposed opposite to the seating point of the rim, when the segments are mounted on the wheel body in parallelism with the axis of the wheel.

In the accompanying drawing two constructional forms of the invention are illustrated by way of example only, in which Fig. 1 shows an end elevation of a detachable rim composed of three segmental portions;

Fig. 2 shows a cross-section through the rim and the adjacent head of a spoke of the wheel together with the means for connecting the rim to the spider-shaped wheel body, the detachable rim being adjusted to a disposition parallel with the axis of the wheel;

Fig. 3 is a top plan view of the joint between two abutting segmental portions of the rim, the segments being radially directed;

Fig. 4 shows a cross-section through the detached rim on which the inflated air tube is mounted, the bottom of the rim slanting downward towards the side at which the rim is seated;

Fig. 5 shows a top plan view of the joint between two abutting segmental portions of the rim, the segments being not adjusted to a disposition parallel with the axis of the wheel, which relative disposition of the segments corresponds to the position of the rim as shown in Fig. 4, and Fig. 6 shows a top plan view of a second constructional form of a joint of the segmental portions of the rim.

The rim 1 is of an undivided cross-section by which is meant that the cross-section of the rim is not parted, the two side flanges 2 and 3 of the rim are for retaining the pneumatic tire 4 in position on the rim against axial disengagement. The rim is composed of several segmental portions, in the present instance three in number, which are designated by 5, 6 and 7 and which are forced outwardly into bearing engagement with the inner circumference of the pneumatic tire 4. The joints 8 limiting the segmental portions at the longitudinal ends thereof are advantageously V-shaped as regards the radial direction.

The inner circumference of the rim is provided laterally of the middle plane thereof with a beveled seating face 9 which rests against a matching conical seating face on the heads 10 of the spokes or arms of the spider-shaped wheel body 11. The heads 10 of the spokes carry bolts 12 provided with clips 13 which on the one hand bear against the respective head and on the other hand against the front side of a seating projection 14 providing at its blunt end the seating faces of the rim. The rear side of this projection 14 enters into bearing engagement with substantially radial shoulders 15 on the heads 10 of the spokes.

The plane portions of the joining faces of the segments of the rim are not parallel with the axis of the wheel, i. e. the mating portions are so relatively deflected that the segments contact with one another only at the side 16 of the rim opposite to that on which the seating projection 14 is arranged. In this way provision is made for a wedge-shaped gap 17 to be left between the individual segments of the rim (Fig. 3), when the rim is pressed onto the radial shoulders 15 on the spokes by means of the bolts 12 and the clips 13. In this disposition of the rim segments the bottom of the rim is in the form of a cylinder (Fig. 2). The gaps 17 afford a certain amount of clearance between the rim segments for providing movable joints therebetween. In this way provision is made for expanding the rim into snug bearing engagement with the radial shoulders that are arranged on the wheel body axially behind the seating face on the latter, when the rim is mounted thereon. This is accomplished by tightening the fastening bolts 12 so that the joining faces of the rim segments are forced apart at the seating end of the rim adjacent these bolts by the seating projection 14 sliding with its blunt end on the conical seating face 9 thereby shifting radially outwardly. During this shifting movement the mating pairs of joining faces abut on one another by point bearing at the end of the rim opposite to its seating face 9 and rock about this point which thus provides a hinge for the segments. In this way the rearward side of the projection 14 is pressed into snug bearing engagement with the shoulders 15, and thus the wheel rim is truly centered on the wheel body and adjusted parallel with the radial direction thereof by the two matching seating faces on the one hand and the rear side of the seating projection and the radial shoulders on the wheel body on the other hand bearing snugly against one another. In this position of adjustment, which is the permanent service position of the wheel rim on the wheel body, these two parts are rigidly connected, actually inseparably flanged to each other, so that there is no possibility of the wheel rim whipping in the radial direction or wabbling in the axial direction, and thus the life of the tire is prolonged by the prevention of secondary stresses which inevitably arise when such defects exist.

The rim 1 prior to being set in place on the wheel spider assumes a shape by effect of the inflated air tube, as shown in the Figs. 4 and 5. The gaps 17 otherwise formed between the segmental portions of the rim are then closed (Fig. 5), in consequence of which the bottom of the rim is not parallel with the axis of the wheel. In Fig. 4 the inclination of the bottom of the rim to the axis of the wheel is shown for the sake of clearness in an exaggerated manner.

In the constructional form of the rim shown in Fig. 6, two adjoining segmental portions are designated by 18 and 19 respectively. 20 refers to a seating face provided on the inner circumference of the rim adjacent to a side flange 21 thereof. 22 represents a side flange of the rim opposite to the end flange 21. The joining faces 23 and 24 of the segmental portions 18 and 19 respectively of the rim are stepped off, in such a manner, that the segments contact with one another only at the end of the rim adjacent to the flange 22, when the rim is mounted in position on a wheel body. The point of contact is designated by 25. Prior to the rim being mounted on the wheel body the gap between the joining faces 23 and 24 is closed by effect of the inflated air tube, in such a way, that the longitudinal ends of the side flange 21 of the rim bear on one another.

The constructions of the joints between the segmental portions of the rim as shown in the Figs. 3 and 6 and described in connection therewith are to be considered as exemplifications only and it will be seen that further constructional forms of the invention may be derived without departing from the spirit of the invention.

What I claim is:

1. In a vehicle wheel, a wheel body, a detachable rim of an undivided cross-section, a seating face for resting against said wheel body laterally of the middle plane thereof provided on said rim, several segmental component parts comprised by said rim, a retaining flange on each side of said rim, and mating joining faces between each two adjacent rim segments relatively deflected to provide bearing contact between said mating joining faces only at a point on the side of said middle plane opposite to said seating face.

2. In a vehicle wheel, a wheel body having a conical seating face, a substantially radial shoulder disposed on said body axially behind said seating face, a segmental detachable tire retaining wheel rim, a seating projection extending radially inwardly from said rim and carrying at its blunt end a seating face matching said seating face on said rim and bearing with its rear side against said radial shoulder, mating joining faces between each two adjacent rim segments deflected relatively to one another adjacent the seating ends of said segments, clamping means screwable into bearing engagement with the front side of said seating projection provided on said body on the side thereof adjacent said seating faces, and screw means interconnecting said body and said clamping means to maintain said rear side of said seating projection in bearing engagement with said shoulders and thereby forcing apart said deflected portions of adjoining mating joining faces so that said ring segments are adjusted parallel with the axis of said wheel body.

JACOB WILLEM MIJNSSEN.